US011338823B2

(12) United States Patent
Guo et al.

(10) Patent No.: US 11,338,823 B2
(45) Date of Patent: May 24, 2022

(54) MULTIPLE SENSOR DATA STORAGE WITH COMPRESSED VIDEO STREAM IN AUTONOMOUS DRIVING VEHICLES

(71) Applicants: Baidu USA LLC, Sunnyvale, CA (US); Baidu.com Times Technology (Beijing) Co., Ltd., Beijing (CN)

(72) Inventors: Shuangcheng Guo, Sunnyvale, CA (US); Shuai Wang, Beijing (CN); Shengjin Zhou, Sunnyvale, CA (US); Ji Wan, Beijing (CN); Haidong Liu, Beijing (CN); Ning Qu, Beijing (CN); Hongshun Shen, Beijing (CN); Manjiang Zhang, Sunnyvale, CA (US)

(73) Assignees: BAIDU USA LLC, Sunnyvale, CA (US); BAIDU.COM TIMES TECHNOLOGY (BEIJING) CO., LTD., Beijing (CN)

( * ) Notice: Subject to any disclaimer, the term of this patent is extended or adjusted under 35 U.S.C. 154(b) by 284 days.

(21) Appl. No.: 16/461,364

(22) PCT Filed: Apr. 29, 2019

(86) PCT No.: PCT/CN2019/084995
§ 371 (c)(1),
(2) Date: May 15, 2019

(87) PCT Pub. No.: WO2020/220199
PCT Pub. Date: Nov. 5, 2020

(65) Prior Publication Data
US 2021/0188310 A1    Jun. 24, 2021

(51) Int. Cl.
*G01S 17/90* (2020.01)
*G01S 17/87* (2020.01)
(Continued)

(52) U.S. Cl.
CPC ............ *B60W 60/001* (2020.02); *G06V 20/49* (2022.01); *G06V 20/56* (2022.01); *B60W 2420/52* (2013.01); *G01S 13/867* (2013.01)

(58) Field of Classification Search
CPC ...... B60W 60/001; B60W 50/08; G01S 17/89; G01S 17/90; G01S 17/87; H04N 5/232;
(Continued)

(56) References Cited

U.S. PATENT DOCUMENTS 10,071,676 B2 * 9/2018 Schofield ............... G06K 9/209
10,257,586 B1 * 4/2019 Mensh ................. G11B 27/102
(Continued)

FOREIGN PATENT DOCUMENTS

KR    20190115265 A * 10/2019 ............... G06F 3/01

*Primary Examiner* — Yuri Kan
(74) *Attorney, Agent, or Firm* — Womble Bond Dickinson (US) LLP

(57) ABSTRACT

An ADV includes a method to combine data from multiple sensors. The method compresses video data from a camera to generate compressed video data. The compressed video data are segmented. The method time synchronizes each segment of the compressed video data with data from other sensors. The method then combines each segment of the compressed video data with the corresponding time-synchronized sensor data for the other sensors. In one embodiment, each segment of the compressed video data is independently decodable. In another embodiment, each segment of the compressed video data includes a compressed video unit that is prepended with a buffered portion of the compressed video data that immediately precede the compressed video unit. The length of the compressed video unit is smaller than the length of the independently decodable segment to offer finer granularity in time synchronizing the compressed video data with the other sensor data with a tradeoff.

20 Claims, 13 Drawing Sheets

(51) Int. Cl.
    *G11B 27/034*     (2006.01)
    *B60W 60/00*     (2020.01)
    *G06V 20/40*     (2022.01)
    *G06V 20/56*     (2022.01)
    *G01S 13/86*     (2006.01)

(58) Field of Classification Search
    CPC ............ H04N 5/235; H04N 1/00; H04N 7/18; H04N 21/85406; H04N 5/35581; G11B 27/031; G11B 27/11; G11B 27/102; G11B 27/034; G06F 3/14; G06F 17/40; G06F 3/1438; B25J 9/16; G06K 9/00; G06K 9/00791; B60Q 1/14; G02B 27/01; G06T 7/246

See application file for complete search history.

(56) References Cited

U.S. PATENT DOCUMENTS

| | | | |
|---|---|---|---|
| 10,296,602 B1* | 5/2019 | Cooper | G06F 16/5866 |
| 10,999,511 B2* | 5/2021 | Yang | G01S 17/89 |
| 2004/0162639 A1* | 8/2004 | Watanabe | B25J 9/1612 |
| | | | 700/259 |
| 2007/0146803 A1* | 6/2007 | Kimura | H04N 21/85406 |
| | | | 358/403 |
| 2014/0055613 A1* | 2/2014 | Ohtomo | H04N 5/23203 |
| | | | 348/144 |
| 2014/0341546 A1* | 11/2014 | Hamada | G11B 27/034 |
| | | | 386/282 |
| 2016/0227092 A1* | 8/2016 | Ikeda | H04N 5/35581 |
| 2016/0357493 A1* | 12/2016 | Zerwas | G06F 3/1438 |
| 2018/0349678 A1* | 12/2018 | Koskan | G06F 16/00 |
| 2019/0369391 A1* | 12/2019 | Cordesses | G06T 19/006 |
| 2020/0021728 A1* | 1/2020 | Yang | G01S 17/87 |
| 2020/0116865 A1* | 4/2020 | Yang | G01S 17/90 |
| 2020/0189611 A1* | 6/2020 | Raichelgauz | G05D 1/0088 |
| 2020/0250837 A1* | 8/2020 | Fagg | G05D 1/0246 |

* cited by examiner

400

| Application 401 | Planning and Control 402 | Perception 403 | Device Driver(s) 404 | Firmware 405 | Hardware 406 |

FIG. 4

MULTIPLE SENSOR DATA STORAGE WITH COMPRESSED VIDEO STREAM IN AUTONOMOUS DRIVING VEHICLES

CROSS-REFERENCE TO RELATED APPLICATION

This patent application is a U.S. National Phase Application under 35 U.S.C. § 371 of International Application No. PCT/CN2019/084995, filed Apr. 29, 2019, entitled "MULTIPLE SENSOR DATA STORAGE WITH COMPRESSED VIDEO STREAM IN AUTONOMOUS DRIVING VEHICLES," which is incorporated by reference herein by its entirety.

TECHNICAL FIELD

Embodiments of the present disclosure relate generally to operating autonomous vehicles. More particularly, embodiments of the disclosure relate to post processing of video streams for autonomous driving vehicles (ADVs).

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. The accuracy and efficiency of the motion planning and control operations depends heavily on the sensors of the vehicle. Sensors such as cameras, light detection and range (LIDAR) units, radars, etc., are used to capture video and electromagnetic images of environments around the vehicle for motion planning and control. In addition to their use in real-time for motion planning and control, sensor data may be required by regulation to be stored for use in accident analyses and for diagnostic purposes.

Standard-based image and video compression algorithms are used to compress the large amount of image or video data captured by cameras for efficient storage. While compressed single image data may be easily combined with data from other sensors, compression of single images may not offer sufficient compression ratio. Compressed video streams, on the other hand, offer higher compression ratio but are difficult to combine and synchronize with other sensor data. A simple and efficient mechanism to combine and time synchronize compressed video data with other sensor data to enable efficient storage and real-time use in ADV is needed.

SUMMARY

In an aspect of the disclosure, a computer-implemented method for operating an autonomous driving vehicle (ADV) is provided. The method includes segmenting, at a sensor unit, video data received from a camera mounted on an autonomous driving vehicle (ADV) into a plurality of video segments, wherein the sensor unit is coupled between a plurality of sensors including the camera and a perception and planning system for autonomously driving the ADV; synchronizing in time each of the video segment with sensor data received from a first sensor of the plurality of sensors; combining each video segment with the corresponding time-synchronized sensor data of the first sensor to generate combined sensor data; and transmitting the combined sensor data to the perception and planning system to be utilized to perceive a driving environment surrounding the ADV at a point in time corresponding to the video segment.

In another aspect of the disclosure, a sensor unit of an autonomous driving system is provided. The sensor unit includes a sensor interface capable of being coupled to a plurality of sensors, including camera mounted on an autonomous driving vehicle (ADV); a host interface capable of being coupled to a perception and planning system; and a synchronization module coupled to the sensor interface and the host interface, where the synchronization module is configured to segment video data received from the camera into a plurality of video segments, synchronize in time each of the video segment with sensor data received from a first sensor of the plurality of sensors, combine each video segment with the corresponding time-synchronized sensor data of the first sensor to generate combined sensor data, and transmit the combined sensor data to the perception and planning system to be utilized to perceive a driving environment surrounding the ADV at a point in time corresponding to the video segment.

In another aspect of the disclosure, an autonomous driving system is provided. The system includes a plurality of sensors, including a camera, to be mounted on an autonomous driving vehicle; a perception and planning system; and a sensor unit, where the sensor unit includes a sensor interface coupled to the plurality of sensors, a host interface capable coupled to the perception and planning system, and a synchronization module coupled to the sensor interface and the host interface, wherein the synchronization module is configured to segment video data received from the camera into a plurality of video segments, synchronize in time each of the video segment with sensor data received from a first sensor of the plurality of sensors, combine each video segment with the corresponding time-synchronized sensor data of the first sensor to generate combined sensor data, and transmit the combined sensor data to the perception and planning system to be utilized to perceive a driving environment surrounding the ADV at a point in time corresponding to the video segment.

BRIEF DESCRIPTION OF THE DRAWINGS

Embodiments of the disclosure are illustrated by way of example and not limitation in the figures of the accompanying drawings in which like references indicate similar elements.

FIG. 4 is a block diagram illustrating architecture of an autonomous driving system according to one embodiment.

DETAILED DESCRIPTION

Figure 1:
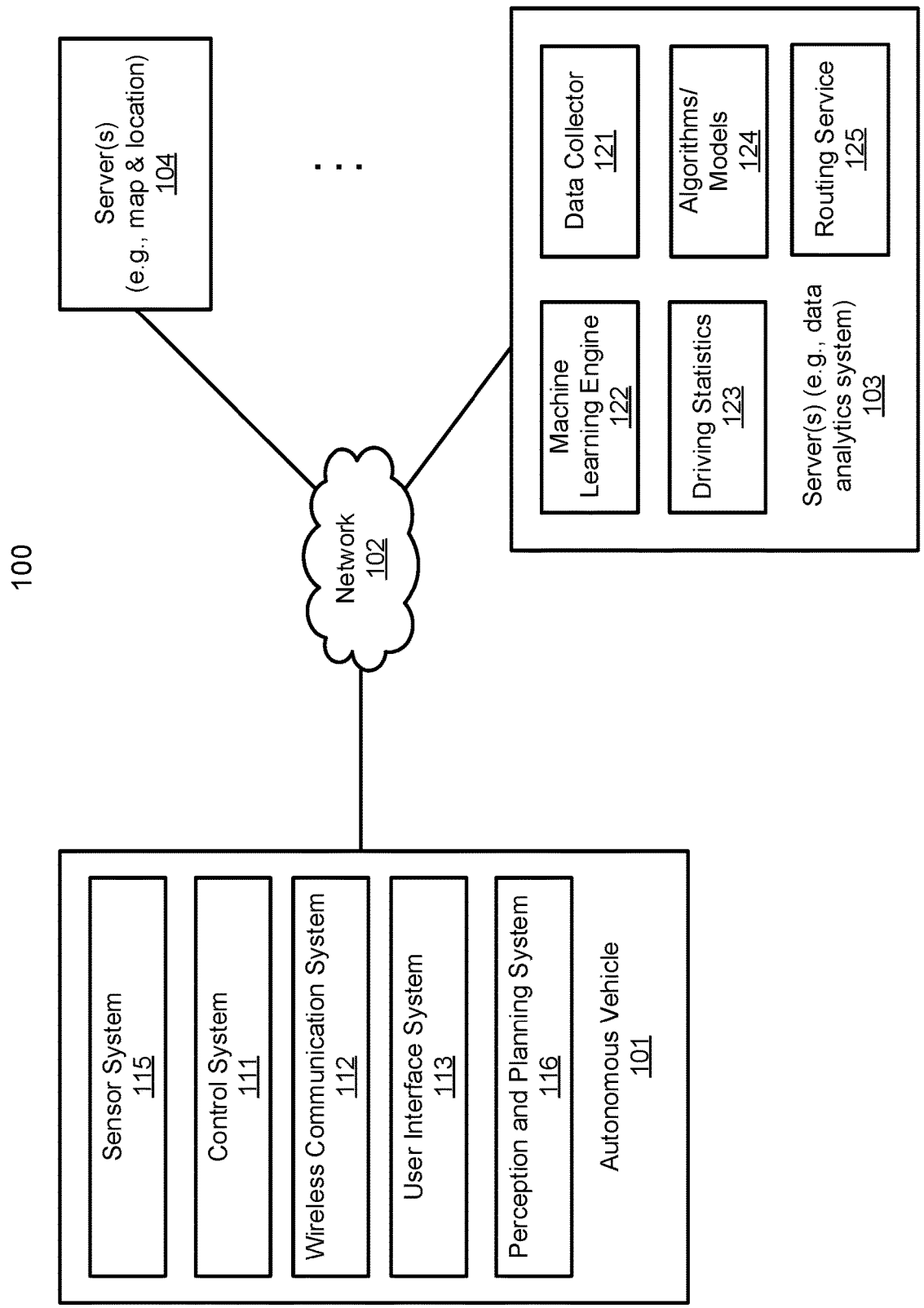
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a method is performed to operate an ADV. The method compresses video data received from a camera to generate compressed video data. The method segments the compressed video data into multiple segments. The method time synchronizes each segment of the compressed video data with data received from other sensors to generate corresponding time-synchronized sensor data for the other sensors. The method then combines each segment of the compressed video data with the corresponding time-synchronized sensor data for the other sensors. Each segment of the compressed video data is independently decodable into uncompressed video data. In another embodiment, each segment of the compressed video data includes a compressed video unit that is prepended with a buffered portion of the compressed video data that immediately precede the compressed video unit. The length of the compressed video unit is smaller than the length of the independently decodable segment of the compressed video data to offer finer granularity in time synchronizing the compressed video data with the other sensor data at a cost of higher overhead.

According to one aspect, in response to video data (e.g., a video stream) received from a camera, the video data is segmented into a number of video segments. Each of the video segments is synchronized in time with sensor data of another sensor (e.g., LIDAR, RADAR). Each video segment is than combined or merged with the corresponding time-synchronized sensor data of the other sensor to form combined sensor data (also referred to as a combined sensor data segment). The combined sensor data is then transmitted to a perception and planning system to be utilized to perceive a driving environment of an autonomous driving vehicle (ADV) and to plan a path to drive the vehicle to navigate through the driving environment at the point in time corresponding to the video segment.

According to another aspect, a sensor unit, which can be utilized as a part of an autonomous driving system, includes a sensor interface, a host interface, and a synchronization module. The sensor interface can be coupled to a number of sensors, including one or more cameras, a LIDAR device, and/or a RADAR device. The host interface can be coupled to a perception and planning system over a bus (e.g., PCIe bus), where the perception and planning system is configured to perceive a driving environment surrounding an ADV and to plan a path to navigate through the driving environment. In one embodiment, the synchronization module receives video data from a camera through the sensor interface and segments the video data into a number of video segments. The synchronization module then synchronizes the timing of the video segments with corresponding sensor data of other sensors (e.g., LIDAR, RADAR), for example, based on the timestamps of the associated sensor data, to generate combined sensor data. The combined sensor data is then transmitted from the sensor unit to the perception and planning system to be utilized therein to perceive a driving environment and to plan a path to drive the vehicle to navigate through the driving environment.

According to a further aspect, an autonomous driving system includes a number of sensors, a perception and planning system, and a sensor unit coupled to the sensors and the perception and planning system, as described above.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 116, vehicle control system 111, wireless communication system 112, user interface system 113, and sensor system 115.

Autonomous vehicle 101 may further include certain common components included in ordinary vehicles, such as, an engine, wheels, steering wheel, transmission, etc., which may be controlled by vehicle control system 111 and/or perception and planning system 116 using a variety of communication signals and/or commands, such as, for example, acceleration signals or commands, deceleration signals or commands, steering signals or commands, braking signals or commands, etc.

Components 111-116 may be communicatively coupled to each other via an interconnect, a bus, a network, or a combination thereof. For example, components 111-116 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
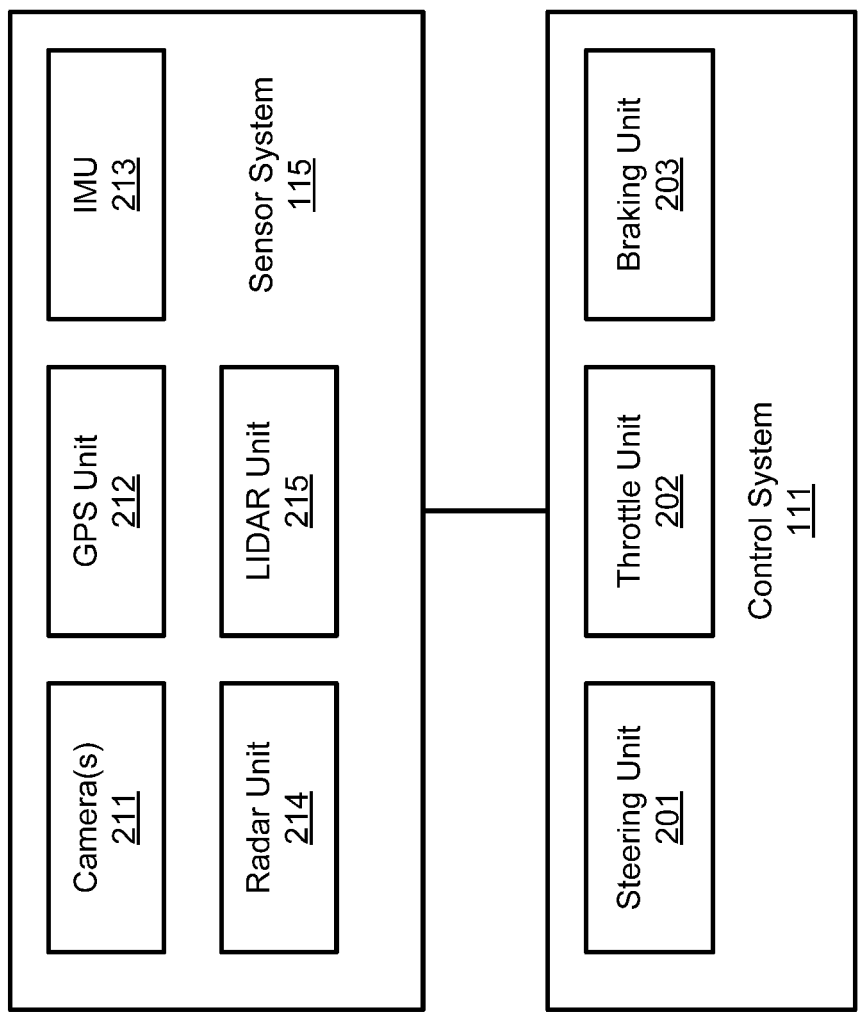
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., a microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 116, especially when operating in an autonomous driving mode. Perception and planning system 116 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 116 may be integrated with vehicle control system 111.

For example, a user as a passenger may specify a starting location and a destination of a trip, for example, via a user interface. Perception and planning system 116 obtains the trip related data. For example, perception and planning system 116 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 116.

While autonomous vehicle 101 is moving along the route, perception and planning system 116 may also obtain real-time traffic information from a traffic information system or server (TIS). Note that servers 103-104 may be operated by a third party entity. Alternatively, the functionalities of servers 103-104 may be integrated with perception and planning system 116. Based on the real-time traffic information, MPOI information, and location information, as well as real-time local environment data detected or sensed by sensor system 115 (e.g., obstacles, objects, nearby vehicles), perception and planning system 116 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include rules or algorithms for perception, prediction, decision, planning, and/or control processes, which will be described in details further below. Algorithms 124 can then be uploaded on ADVs to be utilized during autonomous driving in real-time. In one embodiment, algorithms 124 may combine and time synchronize compressed video data with other sensor data, as well as with system log information, for real-time use in perception and control, and for storage. In one embodiment, video data streams may be compressed and segmented into independently decodable segments. Each independently decodable segment of compressed video data is time synchronized and combined with other sensor data. In another embodiment, video data streams may be compressed and segmented into compressed video units. The compressed video units are not independently decodable but have the advantage of being smaller in length compared to the independently decodable segments and thus may be more flexibly synchronized and combined with other sensor data. To enable subsequent video decoding, a programmable length of compressed video data that immediately precede a compressed video unit may be buffered and prepended to the compressed video unit. Each compressed video unit and its prepended buffered portion is time synchronized and combined with other sensor data. Time synchronization may rely on timestamps tagged to the compressed video and other sensor data.

Segmenting compressed video data into a) independently decodable segments, or b) smaller compressed video units with their software configurable prepended buffered portion, and combining them with time synchronized data from other sensors give upper layer software flexibility to control data merging. Application software may provide control signals for data merging between sensors and system log information. Missing data or data misalignment when combining compressed video data with other sensor data may be eliminated. The combined sensor data may be efficiently stored and retrieved later for analysis or diagnostics. Video decoding may start at the boundaries of the independently decodable segments or the smaller compressed video units with their prepended buffered portion.

Figure 3A:
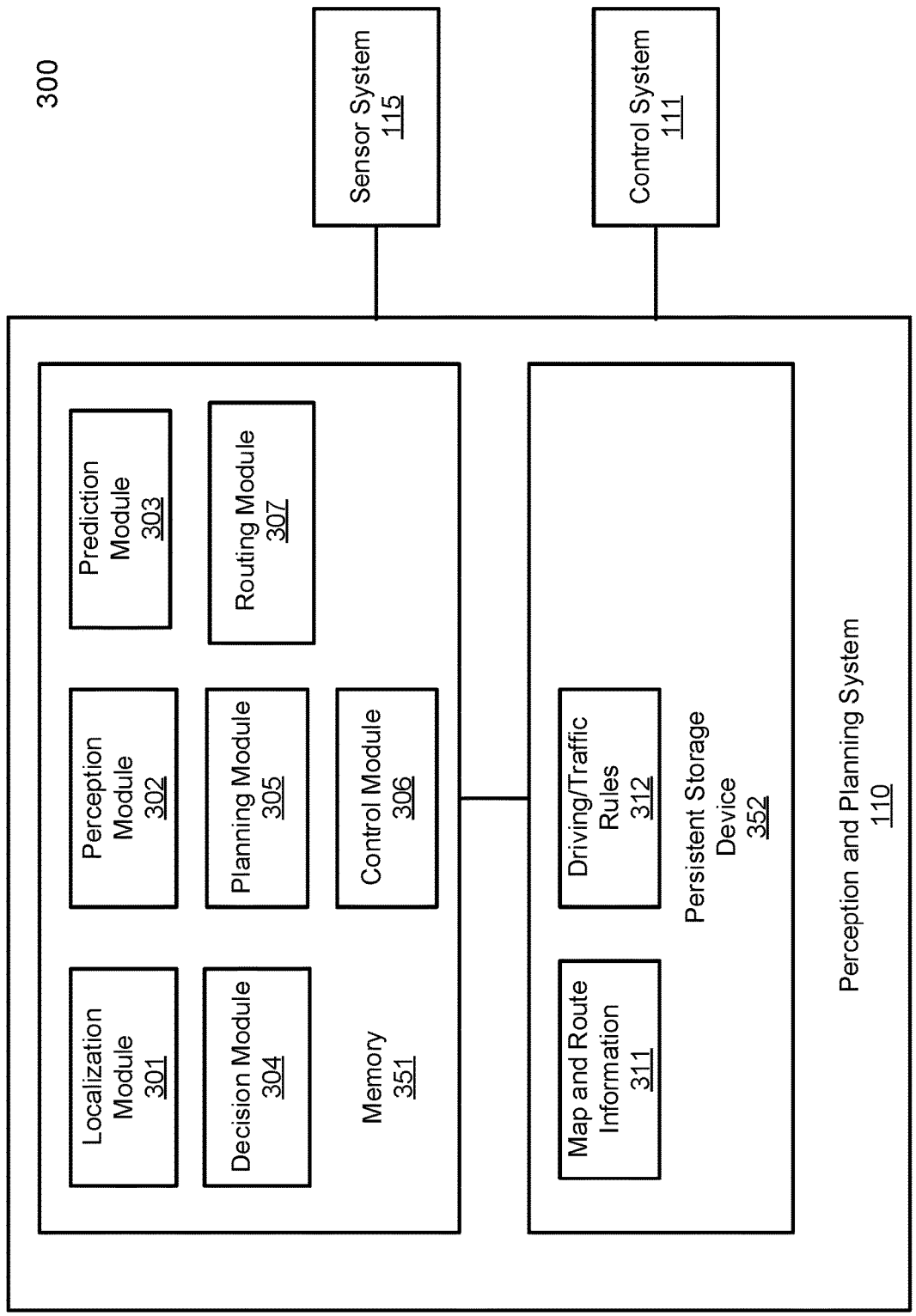
FIGS. 3A-3B are block diagrams illustrating examples of a perception and planning system used by an autonomous vehicle according to some embodiments.
Figure 3B:
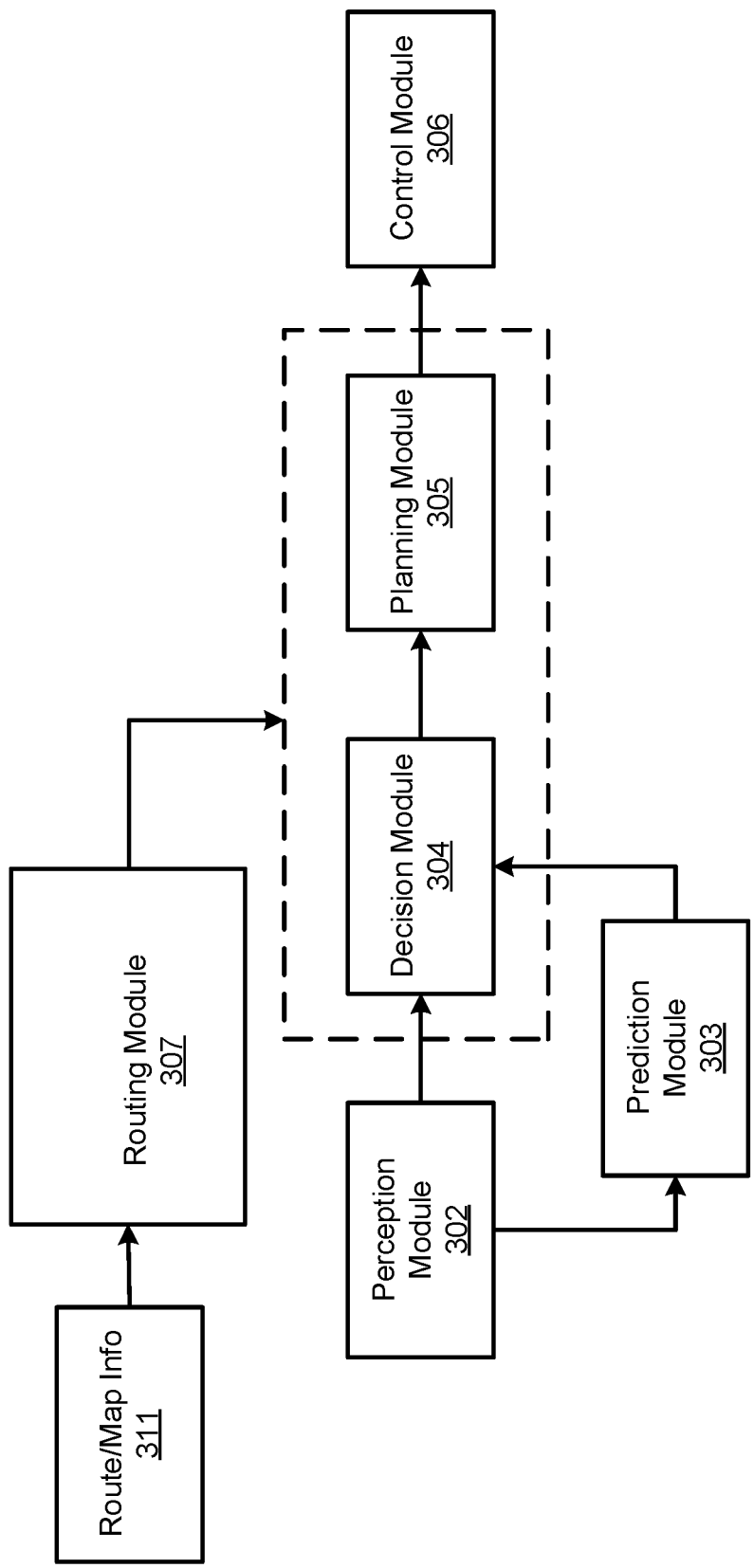

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 116, control system 111, and sensor system 115. Referring to FIGS. 3A-3B, perception and planning system 116 includes, but is not limited to, localization module 301, perception module 302, prediction module 303, decision module 304, planning module 305, control module 306, and routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module. For example, decision module 304 and planning module 305 may be integrated as a single module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Based on a decision for each of the objects perceived, planning module 305 plans a path or route for the autonomous vehicle, as well as driving parameters (e.g., distance, speed, and/or turning angle). That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

In one embodiment, the planning phase is performed in a number of planning cycles, also referred to as command cycles, such as, for example, in every time interval of 100 milliseconds (ms). For each of the planning cycles or command cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 304/planning module 305 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

FIG. 4 is a block diagram illustrating system architecture for autonomous driving according to one embodiment. System architecture 400 may represent system architecture of an autonomous driving system as shown in FIGS. 3A and 3B. Referring to FIG. 4, system architecture 400 includes, but it is not limited to, application layer 401, planning and control (PNC) layer 402, perception layer 403, driver layer 404, firmware layer 405, and hardware layer 406. Application layer 401 may include user interface or configuration application that interacts with users or passengers of an autonomous driving vehicle, such as, for example, functionalities associated with user interface system 113. PNC layer 402 may include functionalities of at least planning module 305 and control module 306. Perception layer 403 may include functionalities of at least perception module 302. In one embodiment, there is an additional layer including the functionalities of prediction module 303 and/or decision module 304. Alternatively, such functionalities may be included in PNC layer 402 and/or perception layer 403. System architecture 400 further includes driver layer 404, firmware layer 405, and hardware layer 406. Firmware layer 405 may represent at least the functionality of sensor system 115, which may be implemented in a form of a field programmable gate array (FPGA). Hardware layer 406 may represent the hardware of the autonomous driving vehicle such as control system 111. Layers 401-403 can communicate with firmware layer 405 and hardware layer 406 via device driver layer 404.

Figure 5A:
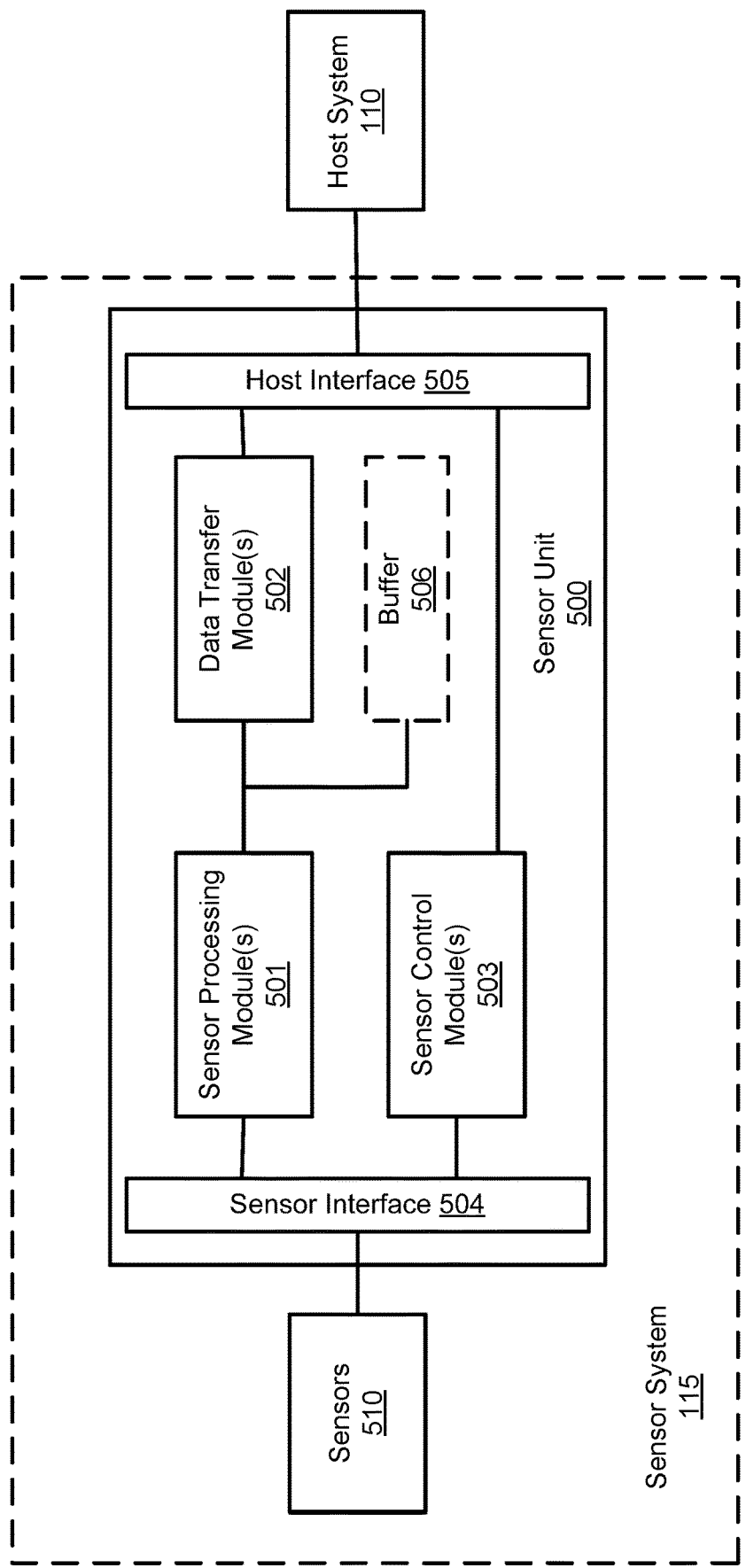
FIG. 5A is a block diagram illustrating an example of a sensor unit according to one embodiment.

FIG. 5A is a block diagram illustrating an example of a sensor system according to one embodiment of the disclosure. Referring to FIG. 5A, sensor system 115 includes a number of sensors 510 and a sensor unit 500 coupled to host system 110. Host system 110 represents a planning and control system as described above, which may include at least some of the modules as shown in FIGS. 3A and 3B. Sensor unit 500 may be implemented in a form of an FPGA device or an ASIC (application specific integrated circuit) device. In one embodiment, sensor unit 500 includes, amongst others, one or more sensor data processing modules 501 (also simply referred to as sensor processing modules), data transfer modules 502, and sensor control modules or logic 503. Modules 501-503 can communicate with sensors 510 via a sensor interface 504 and communicate with host system 110 via host interface 505. Optionally, an internal or external buffer 506 may be utilized for buffering the data for processing.

In one embodiment, for the receiving path or upstream direction, sensor processing module 501 is configured to receive sensor data from a sensor via sensor interface 504 and process the sensor data (e.g., format conversion, error checking), which may be temporarily stored in buffer 506. Data transfer module 502 is configured to transfer the processed data to host system 110 using a communication protocol compatible with host interface 505. Similarly, for the transmitting path or downstream direction, data transfer module 502 is configured to receive data or commands from host system 110. The data is then processed by sensor processing module 501 to a format that is compatible with the corresponding sensor. The processed data is then transmitted to the sensor.

In one embodiment, sensor control module or logic 503 is configured to control certain operations of sensors 510, such as, for example, timing of activation of capturing sensor data, in response to commands received from host system (e.g., perception module 302) via host interface 505. Host system 110 can configure sensors 510 to capture sensor data in a collaborative and/or synchronized manner, such that the sensor data can be utilized to perceive a driving environment surrounding the vehicle at any point in time.

Sensor interface 504 can include one or more of Ethernet, USB (universal serial bus), LTE (long term evolution) or cellular, WiFi, GPS, camera, CAN, serial (e.g., universal asynchronous receiver transmitter or UART), SIM (subscriber identification module) card, and other general purpose input/output (GPIO) interfaces. Host interface 505 may be any high speed or high bandwidth interface such as PCIe (peripheral component interconnect or PCI express) interface. Sensors 510 can include a variety of sensors that are utilized in an autonomous driving vehicle, such as, for example, a camera, a LIDAR device, a RADAR device, a GPS receiver, an IMU, an ultrasonic sensor, a GNSS (global navigation satellite system) receiver, an LTE or cellular SIM card, vehicle sensors (e.g., throttle, brake, steering sensors), and system sensors (e.g., temperature, humidity, pressure sensors), etc.

For example, a camera can be coupled via an Ethernet or a GPIO interface. A GPS sensor can be coupled via a USB or a specific GPS interface. Vehicle sensors can be coupled via a CAN interface. A RADAR sensor or an ultrasonic sensor can be coupled via a GPIO interface. A LIDAR device can be coupled via an Ethernet interface. An external SIM module can be coupled via an LTE interface. Similarly, an internal SIM module can be inserted onto a SIM socket of sensor unit 500. The serial interface such as UART can be coupled with a console system for debug purposes.

Note that sensors 510 can be any kind of sensors and provided by various vendors or suppliers. Sensor processing module 501 is configured to handle different types of sensors and their respective data formats and communication protocols. According to one embodiment, each of sensors 510 is associated with a specific channel for processing sensor data and transferring the processed sensor data between host system 110 and the corresponding sensor. Each channel includes a specific sensor processing module and a specific data transfer module that have been configured or programmed to handle the corresponding sensor data and protocol, as shown in FIG. 5B.

Figure 5B:
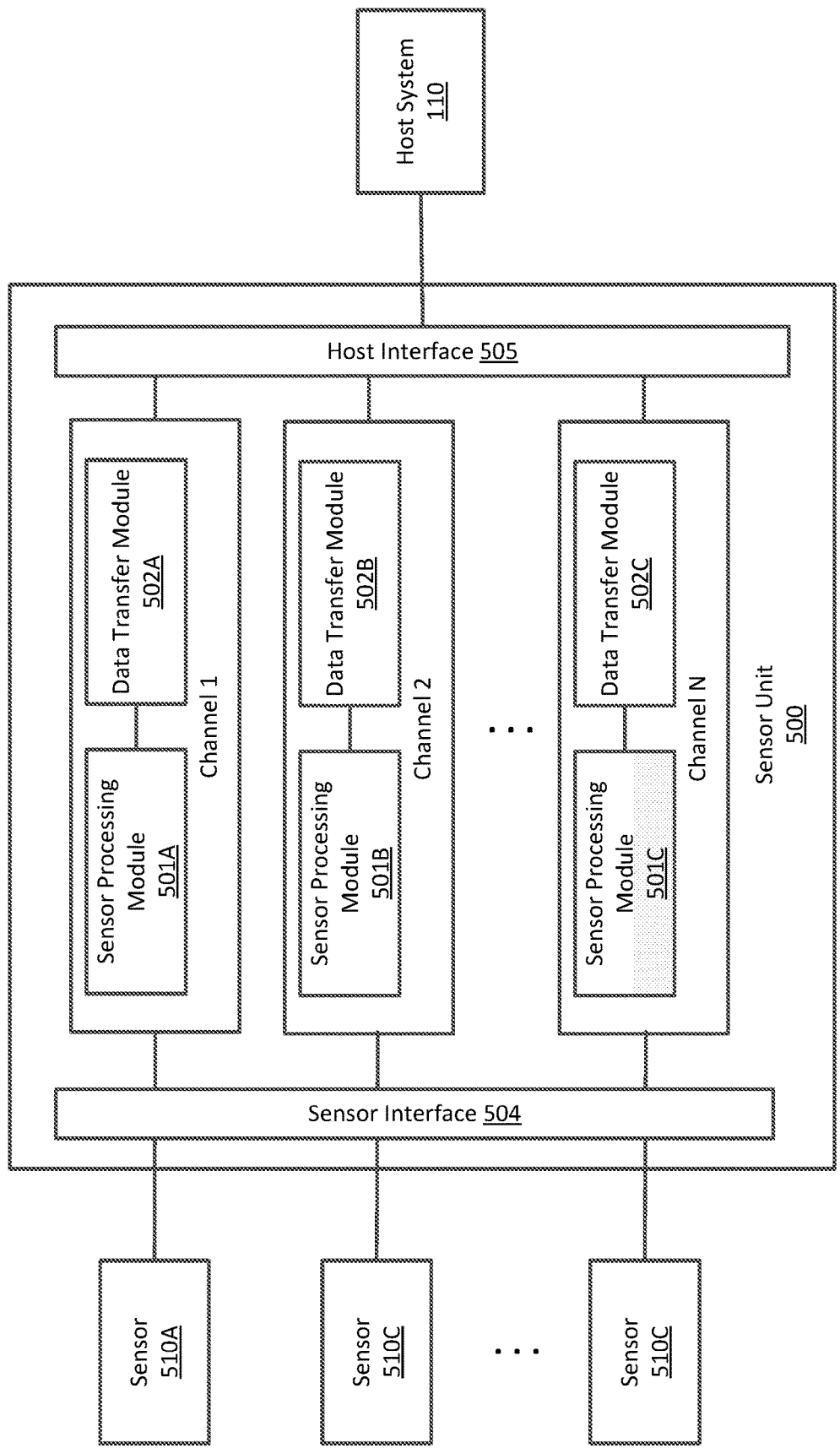
FIG. 5B is a block diagram illustrating an example of a sensor unit combining data from multiple sensors according to one embodiment.

Referring now to FIG. 5B, sensor processing modules 501A-501C are specifically configured to process sensor data obtained from sensors 510A-510C respectively. Note that sensors 510A-510C may the same or different types of sensors. Sensor processing modules 501A-501C can be configured (e.g., software configurable) to handle different sensor processes for different types of sensors. For example, if sensor 510A is a camera, processing module 501A can be figured to handle pixel processing operations on the specific pixel data representing an image captured by camera 510A. Similarly, if sensor 510A is a LIDAR device, processing module 501A is configured to process LIDAR data specifically. That is, according to one embodiment, dependent upon the specific type of a particular sensor, its corresponding processing module can be configured to process the corresponding sensor data using a specific process or method corresponding to the type of sensor data. Similarly, data transfer modules 502A-502C can be configured to operate in different modes, as different kinds of sensor data may be in different size or sensitivities that require different speed or timing requirement.

According to one embodiment, sensor unit 500, which can be utilized as a part of an autonomous driving system, includes a sensor interface, a host interface, and a synchronization module. The sensor interface can be coupled to a number of sensors, including one or more cameras, a LIDAR device, and/or a RADAR device. The host interface can be coupled to a perception and planning system over a bus (e.g., PCIe bus), where the perception and planning system is configured to perceive a driving environment surrounding an ADV and to plan a path to navigate through the driving environment. In one embodiment, the synchronization module receives video data from a camera through the sensor interface and segments the video data into a number of video segments. The synchronization module then synchronizes the timing of the video segments with corresponding sensor data of other sensors (e.g., LIDAR, RADAR), for example, based on the timestamps of the associated sensor data, to generate combined sensor data. The combined sensor data is then transmitted from the sensor unit to the perception and planning system to be utilized therein to perceive a driving environment and to plan a path to drive the vehicle to navigate through the driving environment.

Figure 6:
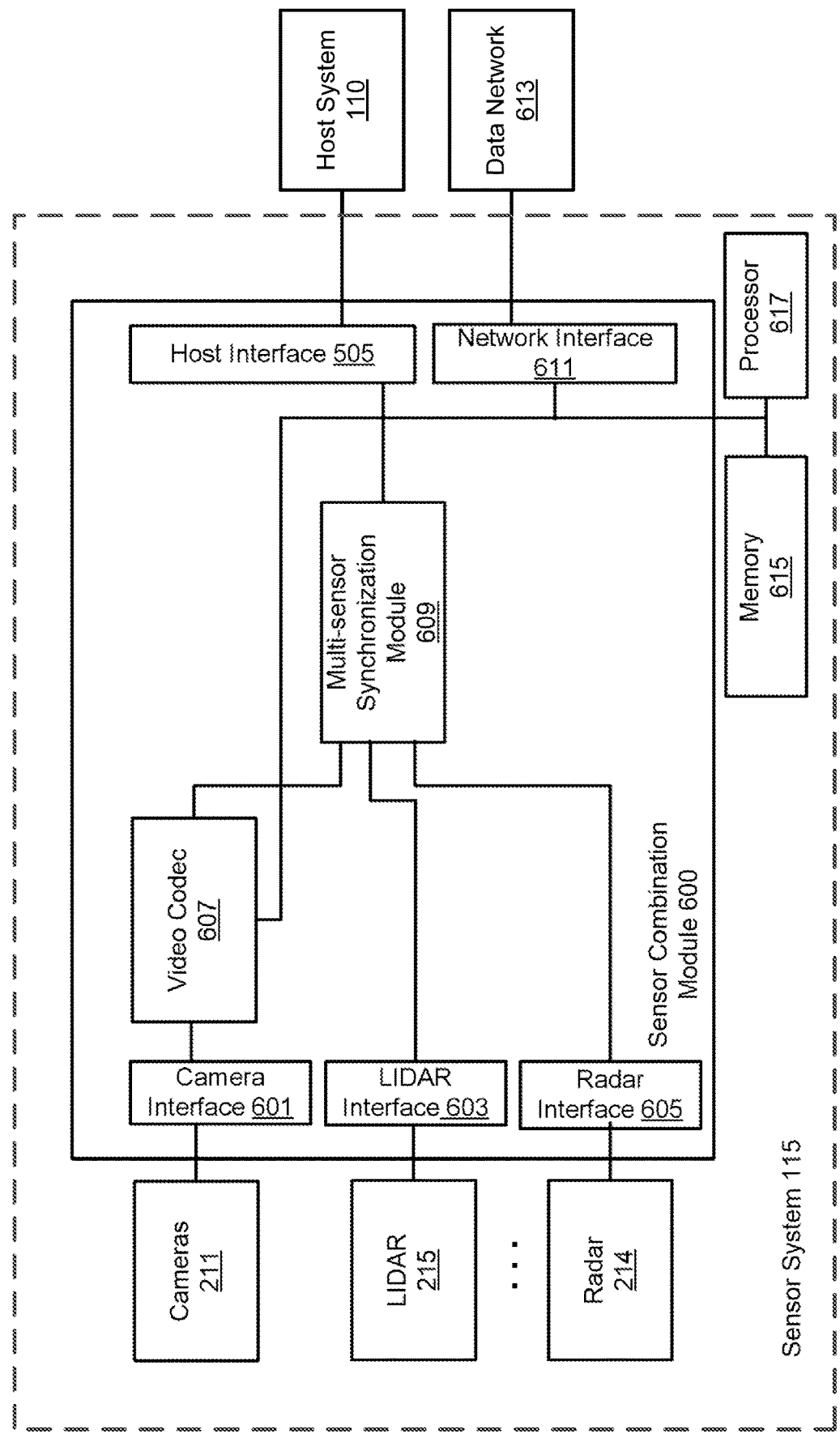
FIG. 6 is a block diagram illustrating an example of a sensor unit combining compressed video data with data from other sensors according to one embodiment.

FIG. 6 is a block diagram illustrating an example of a sensor unit configured to combine compressed video data with data from other sensors according to one embodiment. Sensor system 115 represents one embodiment of the sensor system of FIG. 5B in which the sensors include cameras 211, LIDAR 215, and radar 214. Sensor combination module 600 may represent sensor processing module 501. Cameras 211, LIDAR 215, and radar 214 may each include multiple sensors and each of the sensors may be associated with a channel for providing video or electromagnetic data of the environment surrounding the ADV. While the discussion that follows refers to the data from camera 211 as video data and the operations performed on the camera data as video compression or video processing, it is understood that the data from camera 211 may also represent image data captured by still cameras and the operations performed may be image processing or image compression.

Sensor combination module 600 combines or merges sensor data from camera 211, LIDAR 215, and radar 214, which may be synchronized in time, compressed or uncompressed. The sensor data combining operation may include timestamp tagging of sensor data, video compression of data from camera 211, segmentation of compressed video data, time synchronization of sensor data, merging of sensor data, etc. Sensor combination module 600 may include camera interface 601 configured to receive data from camera 211, LIDAR interface 603 configured to receive data from LIDAR 215, radar interface 605 configured to receive data from radar 214, video codec 607, multi-sensor synchronization module 609 (or synchronization module 609), host interface 505, and network interface 611. In one embodiment, sensor combination module 600 may be implemented in a FPGA or an ASIC. Camera interface 601, LIDAR interface 603, and radar interface 605 are configured to receive data from their respective sensors and may include one or more of Ethernet, USB, LTE or cellular, WiFi, serial (e.g., UART), and other GPIO interfaces.

Video codec 607 may perform video compression on frames of video data from each channel of camera interface 601 using the H.264, H.265, or other industry standard video compression algorithms. Video codec 607 may be implemented in hardware, software, or a combination of hardware and software. Frames of compressed video data may be tagged with timestamps to indicate the times at which the corresponding frames of uncompressed video data were received by camera interface 601 from camera 211. During video compression, video codec 607 may access memory 615. Memory 615 may include one or more volatile storage (or memory) devices such as random access memory (RAM), dynamic RAM (DRAM), synchronous DRAM (SDRAM), double data rate (DDR) DRAM, static RAM (SRAM), or other types of non-volatile solid-state, optical, or magnetic storage devices.

LIDAR interface 603 may tag data from LIDAR 215 with timestamps to indicate the time at which units of LIDAR data are received. Similarly, radar interface 605 may tag data from radar 214 with timestamps to indicate the time at which units of radar data are received. In one embodiment, the LIDAR data or the radar data may be compressed. The timestamps on the compressed video data, the LIDAR data, and the radar data may be used to align or time synchronize the sensor data for combining.

In one embodiment, to combine the compressed video data with the other sensor data, multi-sensor synchronization module 609 may segment the compressed video data into segments such that each segment may contain all the necessary information to video decode the data in the segment. The length of the independently decodable segment may be a function of the compression algorithm of video codec 607. The length of the independently decodable segment may also be software configurable. In one embodiment, the segment length may contain one or more seconds of compressed video data. Multi-sensor synchronization module 609 may time align each independently decodable segment of compressed video data with units of the LIDAR data and radar data based on their respective timestamps. After the sensor data are time aligned, multi-sensor synchronization module 609 may combine the sensor data by storing each segment of compressed video data with the time aligned units of LIDAR data and radar data into memory 615.

Figure 7:
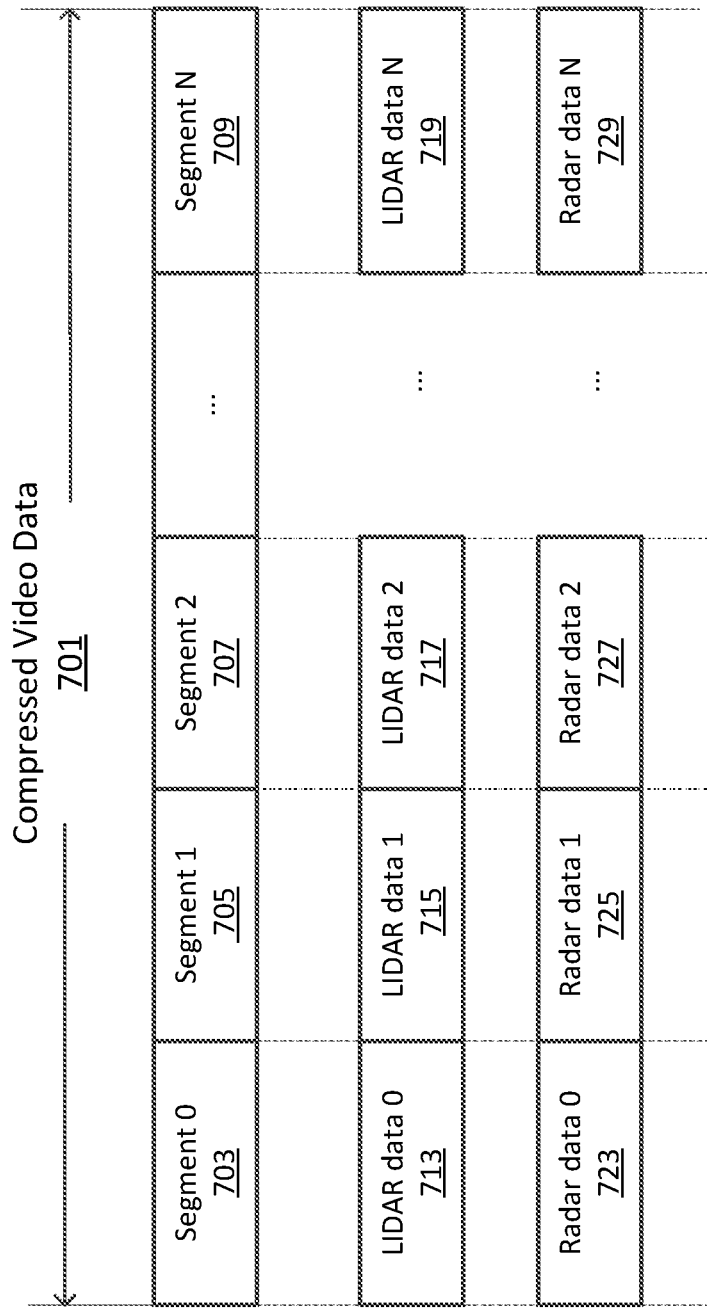
FIG. 7 is a diagram illustrating segmenting compressed video data into independently decodable segments for combining and time synchronizing with data from other sensors according to one embodiment.

FIG. 7 is a diagram illustrating segmenting compressed video data into independently decodable segments for combining and time synchronizing with data from other sensors according to one embodiment. Compressed video data 701 is segmented into N independently decodable segments: segment 0 (703), segment 1 (705), segment 2 (707) . . . segment N (709). Each segment may contain frames of compressed video data spanning several seconds. As discussed, the segment length may depend on the video compression algorithm used to generate the compressed video data 701 and may be software configurable. Each segment may be tagged with a timestamp indicating the starting time at which the uncompressed video data corresponding to the compressed video data 701 in the segment is received from camera 211. Segment 0 (703) of video compressed data 701 is time aligned with LIDAR data and radar data by identifying units of LIDAR data 0 (713) and radar data 0 (723) whose timestamps span between the timestamps associated with segment 0 (703) and segment 1 (705) of the compressed video data. Similarly segment 1 (705) of video compressed data 701 is time aligned with LIDAR data and radar data by identifying units of LIDAR data 1 (715) and radar data 1 (725) whose timestamps span between the timestamps associated with segment 1 (705) and segment 2 (707) of the compressed video data. Similar time alignment is performed for the other segments of the compressed video data 701 with units of LIDAR data and radar data. The time aligned sensor data are combined and written into memory 615. For example, segment 0 (703) of video compression data 701 are concatenated with LIDAR data 0 (713) and radar data 0 (723) and written into memory 615.

Because the segments of the video compressed data 701 are independently decodable, video compressed data 701 may be read at any one segment boundary from memory 615 to enable video decoding starting from that segment boundary. The decoded video data from the segment may then be used with the time aligned LIDAR and radar data to enable analyses or diagnostics of sensor data from that segment forward. Thus, the granularity at which the sensor data are aligned and combined is the segment length of the compressed video data 701. The granularity of the starting point from which the stored sensor data may be read and the compressed video data decoded is also the segment length of the compressed video data 701.

In another embodiment, to combine the compressed video data with the other sensor data, multi-sensor synchronization module 609 may segment the compressed video data into compressed video units that are not independently decodable but are smaller in length compared to the independently decodable segments and thus may be more flexibly synchronized and combined with other sensor data. To enable video decoding, a programmable length of compressed video data that immediately precede a compressed video unit may be buffered and prepended to the compressed video unit. The length of the buffered compressed video unit may be a function of the compression algorithm of video codec 607. The length of the buffered compressed video unit may also be software configurable. Multi-sensor synchronization module 609 may time align each compressed video unit and its prepended buffered portion with units of the LIDAR data and radar data based on their respective timestamps. After the sensor data are time aligned, multi-sensor synchronization module 609 may combine the sensor data by storing each compressed video unit and its prepended buffered portion with the time aligned units of LIDAR data and radar data into memory 615. In one embodiment, the LIDAR data or radar data may also be compressed and segmented into small units that are prepended with a buffered portion for combining. Because the compressed video unit is smaller in length than the independently decodable segment, there is finer granularity and greater flexibility in aligning compressed video data with other sensor data. However, the tradeoff is the increased overhead of the buffered video data that is prepended to the compressed video unit to enable video decoding of the compressed video unit.

Figure 8:
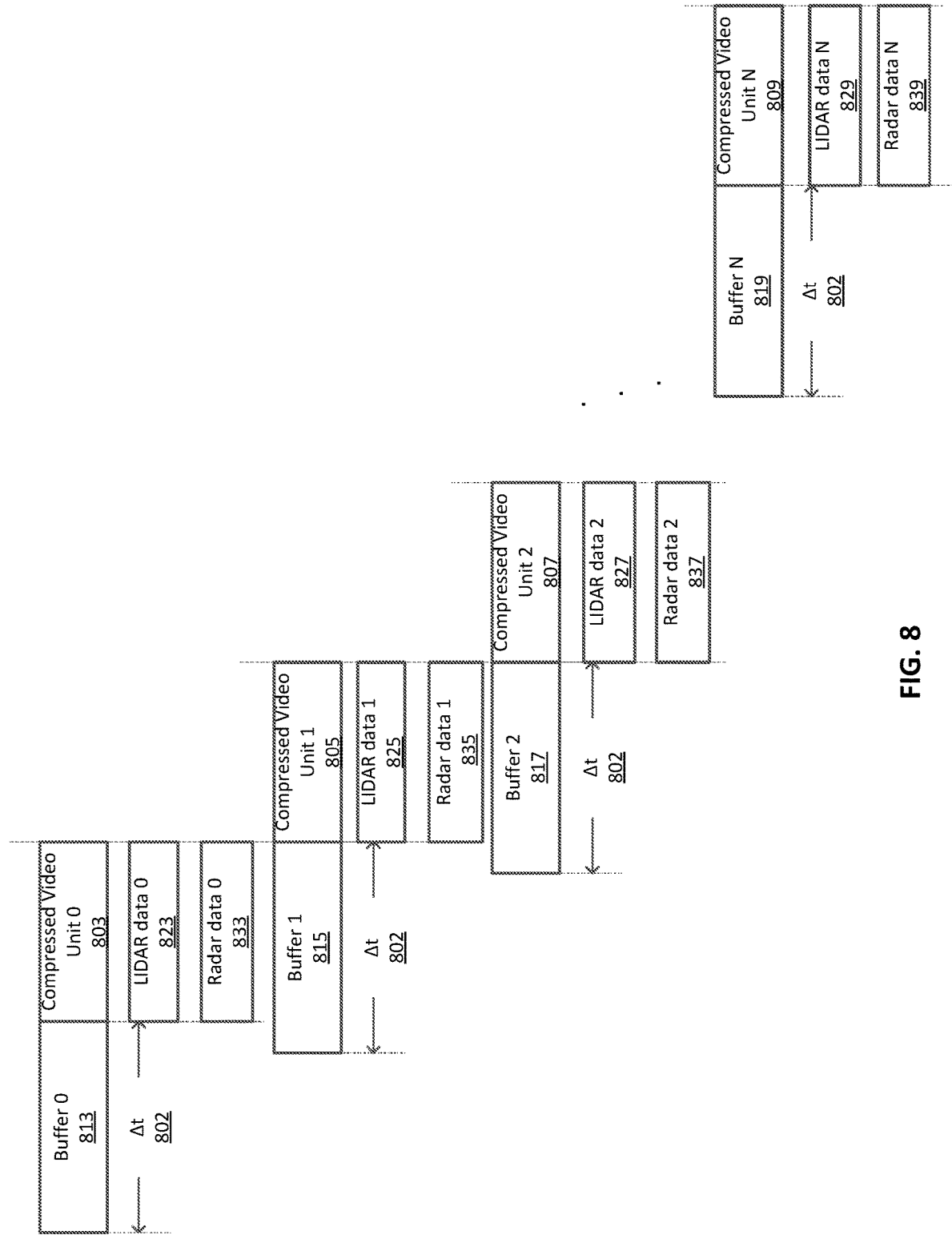
FIG. 8 is a diagram illustrating dividing compressed video data into compressed video units that are combined with buffered compressed video data that precede each compressed video unit for combining and time synchronizing with data from other sensors according to one embodiment.

FIG. 8 is a diagram illustrating dividing compressed video data into compressed video units that are combined with buffered compressed video data that precede each compressed video unit for combining and time synchronizing with data from other sensors according to one embodiment. Compressed video data is divided into N compressed video unit: compressed video unit 0 (803), compressed video unit 1 (805), compressed video unit 2 (807) . . . compressed video unit N (809). Compressed video units may be generated by video codec 607 as packets of compressed video data. Contrary to the independently decodable segments of FIG. 9, compressed video units are not independently decodable and are smaller in length. To enable video decoding of a compressed video unit, extra compressed video data of length $\Delta t$ (802) immediately preceding the compressed video unit are buffered and prepended to the start of the compressed video unit. For example, compressed video data of length $\Delta t$ (802) are buffered in buffer 0 (813) and prepended to compressed video unit 0 (803). If compressed video unit 0 (803) is tagged with a timestamp ts indicating the starting time at which uncompressed video data corresponding to the compressed video unit 0 is received from cameras 211, buffer 0 (813) may buffer $\Delta t$ of compressed video data prior to ts. Thus, buffer 0 (813) may store compressed video data corresponding to video data received from camera 211 during the time interval from (ts−$\Delta t$) to ts.

$\Delta t$ may be a function of the compression algorithm of video codec 607. $\Delta t$ may also be software configurable. Similarly, compressed video data of length $\Delta t$ (802) are buffered in buffer 1 (815) and prepended to compressed video unit 1 (805). Similar buffering and prepending of compressed video data are performed for the other compressed video units.

Compressed video unit 0 (803) is time aligned with LIDAR data and radar data by identifying units of LIDAR data 0 (823) and radar data 0 (833) whose timestamps span between the timestamps associated with compressed video unit 0 (803) and compressed video unit 1 (805). Similarly, compressed video unit 1 (805) is time aligned with units of LIDAR data 1 (825) and radar data 1 (835) whose timestamps span between the timestamps associated with compressed video unit 1 (805) and compressed video unit 2 (807). Similar time alignment is performed for the other compressed video units with units of LIDAR data and radar data. The compressed video units and their associated buffers of compressed video data are combined with their time-aligned LIDAR and radar data and written into memory 615. For example, compressed video data in buffer 0 (813) and compressed video unit 0 (803) are concatenated with LIDAR data 0 (823) and radar data 0 (833) and written into memory 615. Note that there are certain overlaps of compressed video data between successive compressed video units and their associated buffers.

Stored compressed video units and their associated buffers of video compressed data may be read from memory 615 starting at $\Delta t$ (802) before any compressed video unit boundary to enable video decoding starting from that compressed video unit boundary. The decoded video data from the compressed video unit may then be used with the time aligned LIDAR and radar data to enable analyses or diagnostics of sensor data from that compressed video unit forward. Thus, the granularity at which the sensor data are aligned and combined is the length of the compressed video unit. The granularity of the starting point from which the stored sensor data may be read and the compressed video data decoded is also the length of the compressed video unit. Because the length of the compressed video unit is smaller than the length of the independently decodable segment, there is finer granularity and greater flexibility in aligning compressed video data with other sensor data and finer granularity in starting video decoding from the stored compressed video data.

Referring back to FIG. 6, memory 615 may also contain software executed by processor 617 to perform various functions of sensor system 115. For example, processor 617 may read the combined sensor data from memory 615 for transfer to host system 110 using a communication protocol compatible with host interface 505. Host interface 505 may be any high speed or high bandwidth interface such as PCIe interface. In one embodiment, processor 617 may transfer the combined sensor data to data network 613 through network interface 611. Data network 613 may represent other systems of ADV, mass storage devices, or servers 103 or 104. Network interface 611 may be any wired or wireless communication interface. In one embodiment, processor 617 may be configured to perform buffer management functions when determining which independently decodable segment or compressed video unit to start accessing the combined sensor data from memory 615, reading the combined sensor data from the boundary of the determined independently decodable segment or compressed video unit, and transmitting the combined sensor data to host system 110 and data network 613.

Figure 9:
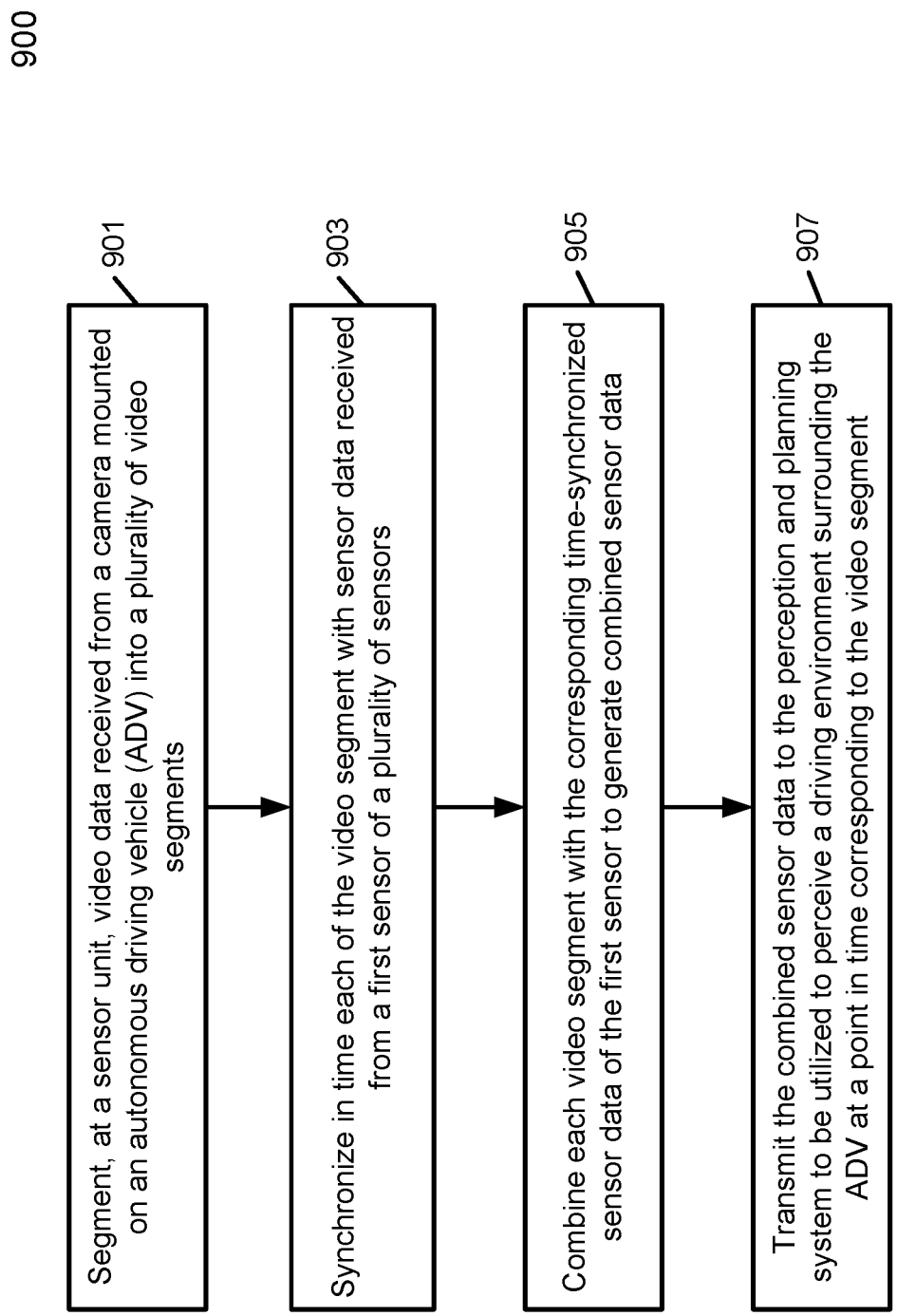
FIG. 9 is a flow diagram illustrating a method of combining and time synchronizing independently decodable segments of compressed video data with data from other sensors according to one embodiment.

FIG. 9 is a flow diagram illustrating a method of combining and time synchronizing independently decodable segments of compressed video data with data from other sensors according to one embodiment. The sensor data combining method 900 may be performed by processing logic which may include software, hardware, or a combination thereof. For example, the sensor data combining method 900 may be performed by multi-sensor synchronization module 609, or the processor 617 of the sensor system 115 of FIG. 6. At block 901, video data received from cameras may be segmented into video segments, for example, based on timing of the video data. Video data may be optionally compressed using the H.264, H.265, or other industry standard video compression algorithms. Frames of compressed video data may be tagged with timestamps to indicate the times at which the corresponding frames of uncompressed video data were received from cameras. The video data may be segmented into independently decodable segments such that each segment may contain all the necessary information to video decode the data in the segment. The length of the independently decodable segment may be a function of the compression algorithm of the video compression algorithm. The length of the independently decodable segment may also be software configurable.

At block 903, each video segment is synchronized in time with other sensor data or sensor data segments of other sensors (e.g., LIDAR, RADAR). At block 905, the processing logic aligns or synchronizes in time each independently decodable segment of compressed video data with other sensor data such as units of the LIDAR data and radar data based on their respective timestamp. For example, each independently decodable segment may be tagged with a timestamp indicating the starting time at which the uncompressed video data corresponding to the compressed video data in the independently decodable segment is received from cameras. An independently decodable segment may be time aligned with other sensor data by identifying units of other sensor data whose timestamps span between the timestamps associated with the independently decodable segment and the following independently decodable segment.

At 907, the processing logic combines each independently decodable segment of compressed video data with other time synchronized sensor data. For example, the processing logic may concatenate each independently decodable segment of compressed video data with the time aligned data from other sensors and write the combined sensor data into a memory.

Figure 10:
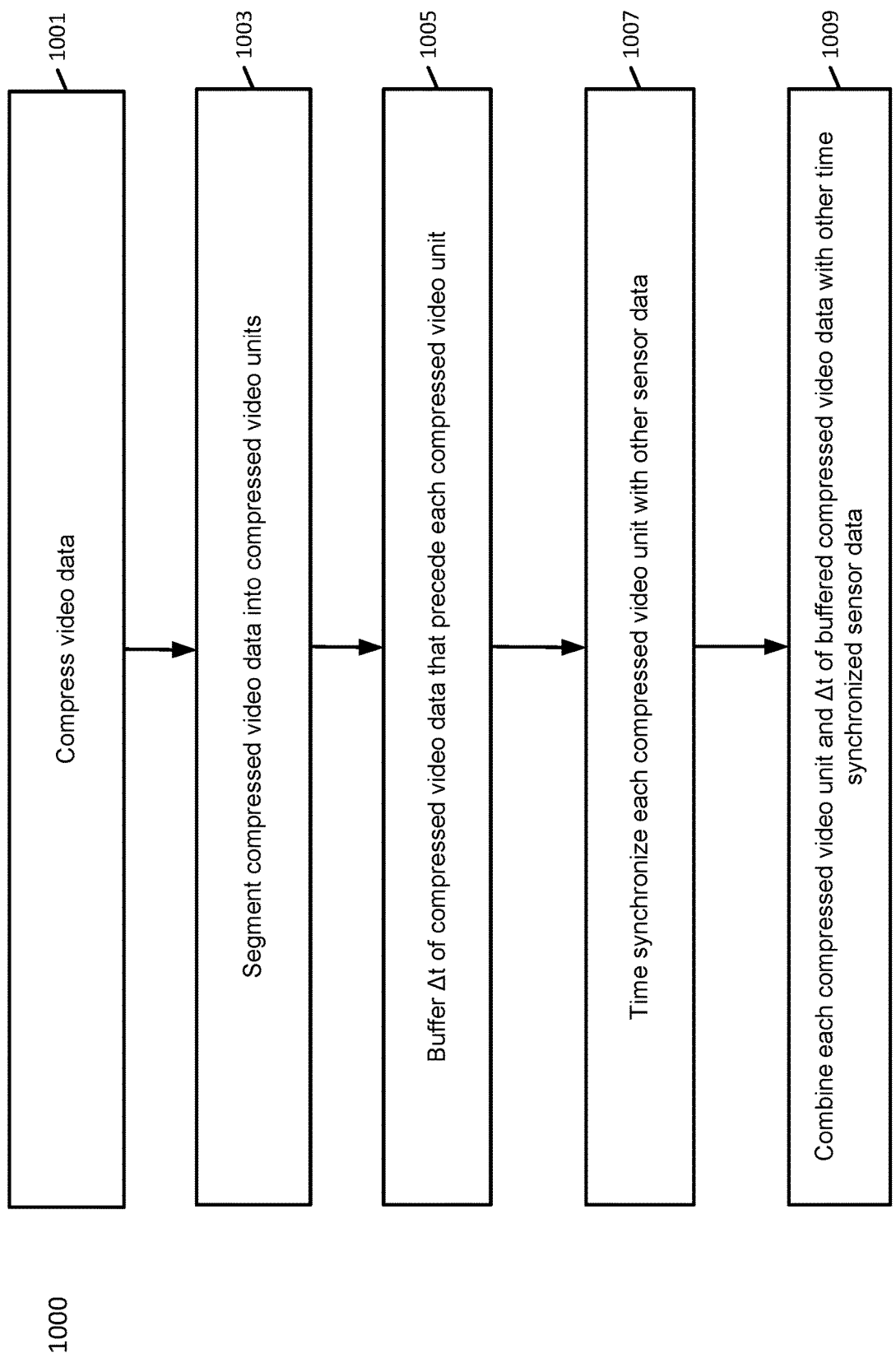
FIG. 10 is a flow diagram illustrating a method of combining and time synchronizing compressed video units that have buffered portions with data from other sensors according to one embodiment.

FIG. 10 is a flow diagram illustrating a method of combining and time synchronizing compressed video units that have buffered portions with data from other sensors according to one embodiment. The sensor data combining method 1000 may be performed by processing logic which may include software, hardware, or a combination thereof. For example, the sensor data combining method 1000 may be performed by multi-sensor synchronization module 609, or the processor 617 of the sensor system 115 of FIG. 6. At block 1001, the sensor data combining method 1000 compresses the video data received from cameras. Video data may be compressed using the H.264, H.265, or other industry standard video compression algorithms. Frames of compressed video data may be tagged with timestamps to indicate the times at which the corresponding frames of uncompressed video data were received from cameras.

At block 1003, the sensor data combining method 1000 segments compressed video data into compressed video units that are not independently decodable but are smaller in length compared to the independently decodable segments and thus may be more flexibly synchronized and combined with other sensor data. Compressed video units may be generated by video codec as packets of compressed video data.

At block 1005, the sensor data combining method 1000 buffers a programmable $\Delta t$ of compressed video data that immediately precede a compressed video unit and prepends the buffered compressed video data to the start of the compressed video unit. $\Delta t$ may be a function of the video compression algorithm. $\Delta t$ may also be software configurable. For example, if a compressed video unit is tagged with a timestamp ts indicating the starting time at which uncompressed video data corresponding to the compressed video unit is received from cameras, the buffer may store compressed video data corresponding to video data received from camera during the time interval from (ts−$\Delta t$) to ts.

At block 1007, the sensor data combining method 1000 aligns or synchronizes in time each compressed video unit and its prepended buffered portion with other sensor data based on their respective timestamp. For example, a compressed video unit tagged with a timestamp may be time aligned with other sensor data by identifying units of other sensor data whose timestamps span between the timestamps associated with the compressed video unit and the following compressed video unit.

At block 1009, the sensor data combining method 1000 combines each compressed video unit and its associated buffer of compressed video data with other time synchronized sensor data. For example, the sensor data combining data 1000 may concatenate each compressed video unit and its associated buffer of compressed video data with the time aligned data from other sensors and write the combined data into a memory.

Figure 11:
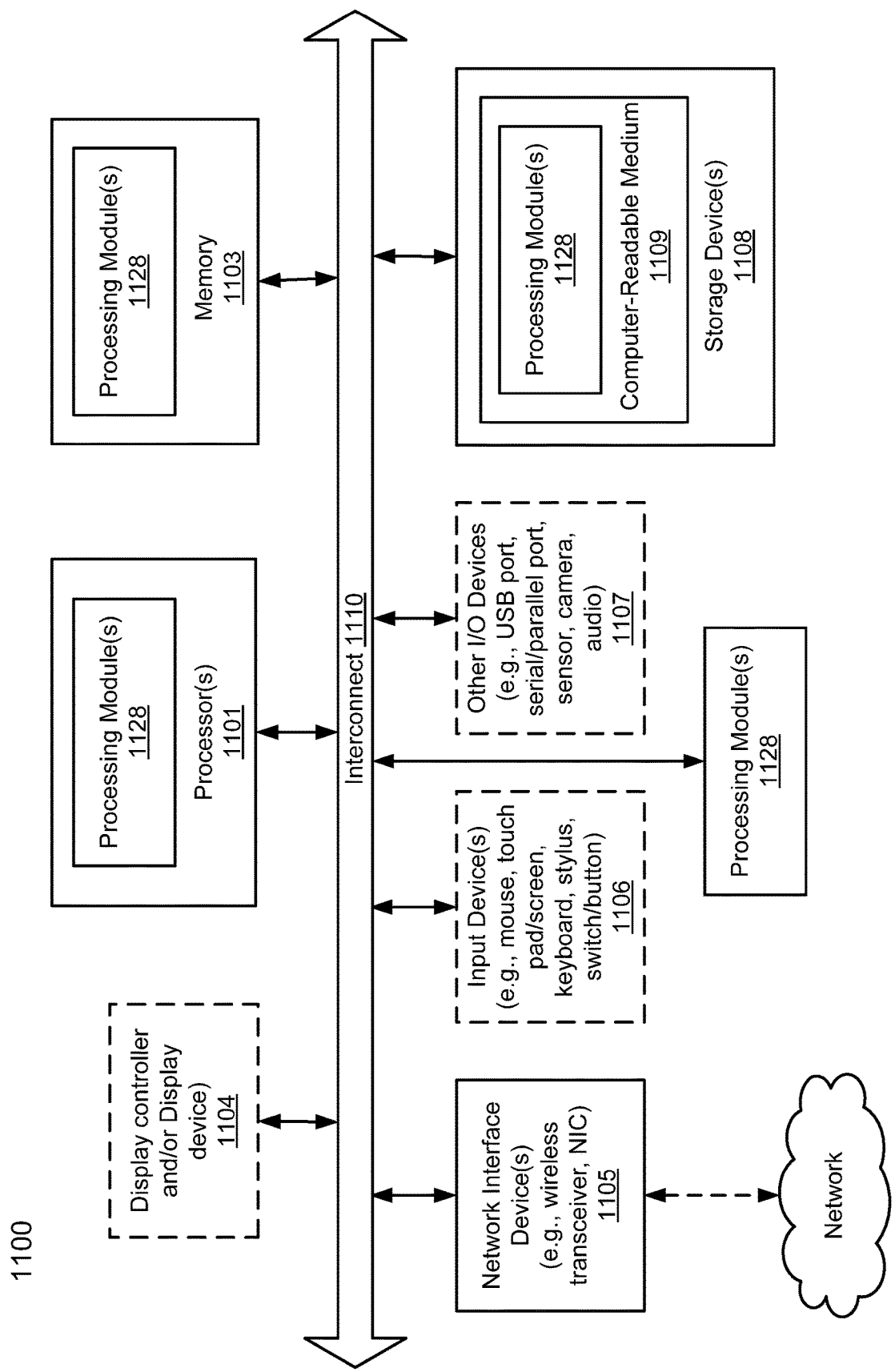
FIG. 11 is a block diagram illustrating a data processing system according to one embodiment.

FIG. 11 is a block diagram illustrating an example of a data processing system which may be used with one embodiment of the disclosure. For example, system 1100 may represent any of data processing systems described above performing any of the processes or methods described above, such as, for example, perception and planning system 116 including decision module 304, planning module 305 of FIGS. 3A and 3B, sensor combination module 600 of FIG. 6, or any of servers 103-104 of FIG. 1. System 1100 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1100 is intended to show a high level view of many components of the computer system. However, it is to be understood that additional components may be present in certain implementations and furthermore, different arrangement of the components shown may occur in other implementations. System 1100 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1100 includes processor 1101, memory 1103, and devices 1105-1108 connected via a bus or an interconnect 1110. Processor 1101 may represent a single processor or multiple processors with a single processor core or multiple processor cores included therein. Processor 1101 may represent one or more general-purpose processors such as a microprocessor, a central processing unit (CPU), or the like. More particularly, processor 1101 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1101 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1101, which may be a low power multi-core processor socket such as an ultra-low voltage processor, may act as a main processing unit and central hub for communication with the various components of the system. Such processor can be implemented as a system on chip (SoC). Processor 1101 is configured to execute instructions for performing the operations and steps discussed herein. System 1100 may further include a graphics interface that communicates with optional graphics subsystem 1104, which may include a display controller, a graphics processor, and/or a display device.

Processor 1101 may communicate with memory 1103, which in one embodiment can be implemented via multiple memory devices to provide for a given amount of system memory. Memory 1103 may include one or more volatile storage (or memory) devices such as random access memory (RAM), dynamic RAM (DRAM), synchronous DRAM (SDRAM), static RAM (SRAM), or other types of storage devices. Memory 1103 may store information including sequences of instructions that are executed by processor 1101, or any other device. For example, executable code and/or data of a variety of operating systems, device drivers, firmware (e.g., input output basic system or BIOS), and/or applications can be loaded in memory 1103 and executed by processor 1101. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1100 may further include IO devices such as devices 1105-1108, including network interface device(s) 1105, optional input device(s) 1106, and other optional IO device(s) 1107. Network interface device 1105 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1106 may include a mouse, a touch pad, a touch sensitive screen (which may be integrated with display device 1104), a pointer device such as a stylus, and/or a keyboard (e.g., physical keyboard or a virtual keyboard displayed as part of a touch sensitive screen). For example, input device 1106 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1107 may include an audio device. An audio device may include a speaker and/or a microphone to facilitate voice-enabled functions, such as voice recognition, voice replication, digital recording, and/or telephony functions. Other IO devices 1107 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1107 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1110 via a sensor hub (not shown), while other devices such as a keyboard or thermal sensor may be controlled by an embedded controller (not shown), dependent upon the specific configuration or design of system 1100.

To provide for persistent storage of information such as data, applications, one or more operating systems and so forth, a mass storage (not shown) may also couple to processor 1101. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1101, e.g., via a serial peripheral interface (SPI). This flash device may provide for non-volatile storage of system software, including BIOS as well as other firmware of the system.

Storage device 1108 may include computer-accessible storage medium 1109 (also known as a machine-readable storage medium or a computer-readable medium) on which is stored one or more sets of instructions or software (e.g., module, unit, and/or logic 1128) embodying any one or more of the methodologies or functions described herein. Processing module/unit/logic 1128 may represent any of the components described above, such as, for example, decision module 304, or planning module 305 of FIGS. 3A and 3B, or sensor combination module 600 of FIG. 6. Processing module/unit/logic 1128 may also reside, completely or at least partially, within memory 1103 and/or within processor 1101 during execution thereof by data processing system 1100, memory 1103 and processor 1101 also constituting machine-accessible storage media. Processing module/unit/logic 1128 may further be transmitted or received over a network via network interface device 1105.

Computer-readable storage medium 1109 may also be used to store the some software functionalities described above persistently. While computer-readable storage medium 1109 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1128, components and other features described herein can be implemented as discrete hardware components or integrated in the functionality of hardware components such as ASICS, FPGAs, DSPs or similar devices. In addition, processing module/unit/logic 1128 can be implemented as firmware or functional circuitry within hardware devices. Further, processing module/unit/ logic 1128 can be implemented in any combination hardware devices and software components.

Note that while system 1100 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle (ADV), the method comprising:
    segmenting, at a sensor unit, video data received from a camera mounted on the ADV into a plurality of video segments, further comprising:
        segmenting the video data into a plurality of video units;
        buffering a length of the video data that immediately precede each of the video units; and
        prepending the buffered video data to a start of a corresponding video unit to generate one of the plurality of segments of the video data, wherein the sensor unit is coupled between a plurality of sensors including the camera and a perception and planning system for autonomously driving the ADV;
    synchronizing in time each of the video segment with sensor data received from a first sensor of the plurality of sensors;
    combining each video segment with a corresponding time-synchronized sensor data of the first sensor to generate combined sensor data; and
    transmitting the combined sensor data to the perception and planning system to be utilized to perceive a driving environment surrounding the ADV at a point in time corresponding to the video segment.

2. The method of claim 1, further comprising, prior to segmenting the video data, compressing the video data into compressed video data, wherein each segment of the compressed video data is independently decodable into uncompressed video data.

3. The method of claim 2, wherein compressing the video data comprises using a predetermined compression process, and wherein a length of each segment of the compressed video data is determined by the predetermined compression process.

4. The method of claim 1, wherein combining each segment of the video segments with the corresponding time-synchronized sensor data comprises:
    combining the buffered video data prepended to the start of the corresponding video unit and the corresponding video unit with the corresponding time-synchronized sensor data.

5. The method of claim 1, wherein the length of the video data that immediately precede each of the video units is configurable.

6. The method of claim 1, wherein synchronizing in time each segment of the video segments with the sensor data received from the first sensor comprises:
 tagging each segment of the of the video segments with a respective first timestamp;
 tagging the sensor data received from the first sensor with a second timestamp; and
 identifying the corresponding time-synchronized sensor data based on the first timestamp and the second timestamp.

7. The method of claim 1, wherein the first sensor comprises a LIDAR device or a RADAR device.

8. A sensor unit of an autonomous driving system, the sensor unit comprising:
 a processor;
 a sensor interface capable of being coupled to a plurality of sensors, including camera mounted on an autonomous driving vehicle (ADV);
 a host interface capable of being coupled to a perception and planning system; and
 a memory coupled to the processor to store instructions, which when executed by the processor, cause the processor to perform operations, the operations comprising:
 segmenting video data received from the camera into a plurality of video segments further comprising:
  segmenting the video data into a plurality of video units;
  buffering a length of the video data that immediately precede each of the video units; and
  prepending the buffered video data to a start of a corresponding video unit to generate one of the plurality of segments of the video data;
 synchronizing in time each of the video segment with sensor data received from a first sensor of the plurality of sensors;
 combining each video segment with a corresponding time-synchronized sensor data of the first sensor to generate combined sensor data; and
 transmitting the combined sensor data to the perception and planning system to be utilized to perceive a driving environment surrounding the ADV at a point in time corresponding to the video segment.

9. The sensor unit of claim 8, wherein prior to segmenting the video data, the operations further comprise:
 compressing the video data into compressed video data, wherein each segment of the compressed video data is independently decodable into uncompressed video data.

10. The sensor unit of claim 9, wherein the video data is compressed using a predetermined compression process, and wherein a length of each segment of the compressed video data is determined by the predetermined compression process.

11. The sensor unit of claim 8, wherein in combining each segment of the video segments with the corresponding time-synchronized sensor data, the operations further comprise:
 combining the buffered video data prepended to the start of the corresponding video unit and the corresponding video unit with the corresponding time-synchronized sensor data.

12. The sensor unit of claim 8, wherein the length of the video data that immediately precede each of the video units is configurable.

13. The sensor unit of claim 8, wherein in synchronizing in time each segment of the video segments with the sensor data received from the first sensor, the operations further comprise:
 tagging each segment of the of the video segments with a respective first timestamp;
 tagging the sensor data received from the first sensor with a second timestamp; and
 identifying the corresponding time-synchronized sensor data based on the first timestamp and the second timestamp.

14. The sensor unit of claim 8, wherein the first sensor comprises a LIDAR device or a RADAR device.

15. An autonomous driving system, comprising:
 a plurality of sensors, including a camera, to be mounted on an autonomous driving vehicle;
 a perception and planning system; and
 a sensor unit, wherein the sensor unit includes:
  a processor;
  a sensor interface coupled to the plurality of sensors;
  a host interface capable coupled to the perception and planning system; and
  a memory coupled to the processor to store instructions, which when executed by the processor, cause the processor to perform operations, the operations comprising:
  segmenting video data received from the camera into a plurality of video segments further comprising:
   segmenting the video data into a plurality of video units;
   buffering a length of the video data that immediately precede each of the video units; and
   prepending the buffered video data to a start of a corresponding video unit to generate one of the plurality of segments of the video data;
  synchronizing in time each of the video segment with sensor data received from a first sensor of the plurality of sensors;
  combining each video segment with a corresponding time-synchronized sensor data of the first sensor to generate combined sensor data; and
  transmitting the combined sensor data to the perception and planning system to be utilized to perceive a driving environment surrounding the ADV at a point in time corresponding to the video segment.

16. The system of claim 15, wherein prior to segmenting the video data, the operations further comprise:
 compressing the video data into compressed video data, wherein each segment of the compressed video data is independently decodable into uncompressed video data.

17. The system of claim 16, wherein the video data is compressed using a predetermined compression process, and wherein a length of each segment of the compressed video data is determined by the predetermined compression process.

18. The system of claim 17, wherein combining each segment of the video segments with the corresponding time-synchronized sensor data comprises:
 combining the buffered video data prepended to the start of the corresponding video unit and the corresponding video unit with the corresponding time-synchronized sensor data.

19. The system of claim 17, wherein the length of the video data that immediately precede each of the video units is configurable.

20. The system of claim 17, wherein synchronizing in time each segment of the video segments with the sensor data received from the first sensor comprises:
- tagging each segment of the of the video segments with a respective first timestamp;
- tagging the sensor data received from the first sensor with a second timestamp; and
- identifying the corresponding time-synchronized sensor data based on the first timestamp and the second timestamp.

* * * * *